United States Patent [19]

Fisher et al.

[11] 3,716,850

[45] Feb. 13, 1973

[54] SYNCHRONOUS DETECTOR FOR MONOPULSE KEY SAMPLING ELECTRONIC KEYBOARD

[75] Inventors: Donald E. Fisher, Wappingers Falls; Peter Pleshko, Kotonah, both of N.Y.

[73] Assignee: International Business Machines Corporation, Armonk, N.Y.

[22] Filed: Dec. 21, 1971

[21] Appl. No.: 210,427

[52] U.S. Cl. ........340/365 E, 235/153 A, 307/247 A, 340/146.1 AB

[51] Int. Cl. ........H04q 3/00

[58] Field of Search ........340/365 E, 146.1 AB; 235/153 A; 307/247 A

[56] References Cited

UNITED STATES PATENTS

| | | | |
|---|---|---|---|
| 3,471,789 | 10/1969 | Nutting et al. | 340/365 E |
| 3,504,200 | 3/1970 | Avellar | 340/365 E |
| 3,508,079 | 4/1970 | Moll et al. | 340/365 E |

*Primary Examiner*—Donald J. Yusko
*Assistant Examiner*—Robert J. Mooney
*Attorney*—John A. Jordan et al.

[57] ABSTRACT

A synchronous detector for monopulse key sampling in electronic keyboards. A variable threshold feedback network prevents false sampling due to signal distortions caused by "key bounce," and the like. A single output pulse, in synchronism with and of the same time duration as system clock pulses, is produced at the detector output, in response to the clock pulses being capacitively coupled to its input, upon key depression. The single pulse, used to identify the key depressed via a decode circuit, permits "key roll."

10 Claims, 4 Drawing Figures

INVENTORS
DONALD E. FISHER
PETER PLESHKO

BY John A. Jordan
ATTORNEY

SYNCHRONOUS DETECTOR FOR MONOPULSE KEY SAMPLING ELECTRONIC KEYBOARD

BACKGROUND OF THE INVENTION

1. Field of the Invention

The present invention relates to transducers for converting actuation of a key into a coded output signal which identifies that key. More particularly, the present invention relates to key signal detectors, employed in electronic key-boards, and the like.

Various techniques exist in the prior art of electronic keyboards, for transforming key depressions into coded signals which identify the depressed key. One common technique is to employ a Hall generator with each key of the keyboard so that upon depression of a key, signals are generated thereform to identify the depressed key. The difficulty with such arrangements resides in their complexity and cost. Other techniques, likewise, exist for transforming key depressions into coded signals. However, these, in the main, also suffer from complexity and cost.

One reasonably simple and low cost approach is to employ a series AC switch in the form of a capacitive key arrangement, whereby upon depression of the key, pulses from a pulse source are AC coupled to a detector arrangement. However, one of the difficulties with employing capacitive key AC coupling resides in the fact that noise in the form of "key bounce," and the like, readily distorts and influences the pulses coupled therethrough. Accordingly, although the "key bounce" aspect of the capacitive key AC coupling approach makes its use somewhat disadvantageous, on the other hand the many advantages incident to such approach make its use attractive. For example, one advantage of the capacitive key AC coupling approach, in addition to simplicity and low cost, resides in its flexibility. This flexibility may be seen when it is recognized that capacitive key AC coupling may be employed in one arrangement where the key is itself coded. In the coded key arrangement, the coded keys may readily be replaced by other coded keys. Alternatively, capacitive key AC coupling may be employed where all the code circuits are on a "mother" board.

In addition to effectively confronting the problems presented by "key bounce," good electronic keyboard implementations must also successfully confront the problems encountered in providing "key roll" feature. In keyboard technology, "key roll" exists when two keys are depressed simultaneously (or at least nominally so), or at least very close in time. "Key roll" may be avoided by locking out all other keys but the one depressed. However, "key roll," from the human factors standpoint, is basically desirable and accordingly, when keys are allowed to be so depressed, if provision is not made for independently detecting the signals produced, in response to this multiple depression of keys, ambiguity is encountered. One solution to this latter problem is to design the detector, which is responsive to some form of indications produced by the depression of the key, so that only a single pulse of short duration is generated therefrom. Accordingly, with such an arrangement, if one key is not released before the next is depressed, no ambiguity is encountered. It can be seen, in this regard, that the duration of the pulse generated by the detector in question can readily be made to be smaller than the closest approach to manual simultaneous depression of keys, i.e. the smallest likely difference in time achievable when manually attempting to simultaneously depress keys on a keyboard.

2. Description of the Prior Art

Various prior art approaches have been employed in an endeavor to confront the problems caused by "key bounce." For example, one prior art approach to these problems involves an integration arrangement, whereby the signal distortions produced by mechanical bounce and chatter, in the signal generated in response to key depressions, are filtered out. However, one of the difficulties in such approach resides in the fact that integration requires a large capacitor, or the like, and when implementing the circuitry for the keyboard in silicon technology, a capacitor of the order required for integration would require a considerable silicon area, and thus would be costly.

Another prior art approach to the problems caused by "key bounce" is to employ some form of trigger circuit or bistable latching circuit. In such arrangements, the bistable switch acts as a buffer whereby the leading edge of the pulse produced by key depression is used to trigger the bistable switch, the output of which, in response thereto, is latched to the quiescent switch level, and is therefor isolated from the possibly distorted input trigger pulse. Typical of such arrangements is that shown by Lockwood in U.S. Pat. No. 3,324,306.

Further prior art approaches to the problems caused by "key bounce" employ a combination of the above described approaches. For example, U.S. Pat. No. 2,864,007 to G. O. Clapper describes an arrangement whereby a trigger circuit is employed in combination with a feedback integration arrangement, to thereby obviate the problems of contact bounce, when closing a mechanical switch. However, it can be seen that both Clapper and Lockwood employ DC coupling to produce a pulse, the duration of which is determined by the duration of the closure of the switch.

Contrary to the manner in which Clapper and Lockwood effect production of a pulse, in response to closure of a switch, electronic keyboard operation requires, in order to allow "key roll," a single output pulse of short duration, independent of the length of time the key is depressed. In addition, such pulse must be rapidly produced in response to depression of the key, and in the face of the advantages to capacitive key AC coupling, the pulse must be so produced, more particularly, in response to the making of an AC coupling connection.

One approach to producing a single short pulse in response to depression of a key to effect AC coupling, and yet, at the same time avoid the problems of "key bounce," is to employ feedback from the output of a detector to the input of a variable threshold device. In accordance with such an arrangement, the variable threshold device is coupled to a detector, such as a monostable detector. The output of the monostable detector is fed back to the input of the variable threshold device to maintain latter in its "on" state so that distortions in the signal AC coupled thereto do not affect the output thereof. However, the detector in such an arrangement, likewise, requires capacitors and, accordingly, when implementing the detection circuitry in silicon technology, for example, an unnecessarily large silicon area is thereby required making it costly. In addition, such an arrangement does not satisfactorily confront the problems encountered in permitting "key roll."

Prior art arrangements which address the problems encountered in both "contact bounce" and providing a "key roll" capability are known. For example, U.S. Pat. No. 3,471,789 to B. W. Nutting et al and U.S. Pat. No. 3,508,079 to E. W. Moll et al., each describe arrangements which combine features of anti-bounce and single sensing, whereby a key depression of undetermined time duration is sensed without sensing the same depression more than once, until the key is released for reset. However, in the Nutting et al and Moll et al circuits, the single output pulse is asynchronously produced in response to closure of a DC switch. In addition, the single output pulse produced in Nutting et al and Moll et al is of one clock-time duration.

SUMMARY OF THE INVENTION

Accordingly, in accordance with the principles of the present invention, a synchronous detector arrangement using variable threshold, for monopulse key sampling in electronic keyboards, and the like, is provided. In the present invention, depression of a key capacitively couples clock pulses to a triggered gate. The triggered gate in turn acts to change the DC level in a level generator. The changed DC level, in turn, is employed with a variable threshold network to prevent "key bounce" distortions and the like in the capacitively coupled clock pulses from retriggering the triggered gate. The triggered gate and level generator act to effect a single pulse output, in a single pulse gate arrangement. Thus, by the synchronous detector arrangement of the present invention, a single output pulse, in synchronism with and of the same time duration as the initiating clock pulse, is unambiguously produced in response to one depression of the key the latter having acted to effect capacititive coupling of the system clock to the detector. In the "single pulse" mode of the keyboard, only one output pulse is produced per key depression, regardless of the time duration of that depression. In the "key repeat" mode of the keyboard, a repetition or burst of pulses for the duration of the key depression is produced by depressing the "repeat" key to allow a pulse of the duration of the key depression to initialize an oscillator or clock pulse gate, so as to produce the required repetition of pulses.

By employing logic gates to implement the detector, all level switching may be initiated by the clock, and accordingly, no timing capacitors are required. Although NOR logic is disclosed for this purpose, any of the variety of basic logic gates known in the art may be employed.

It is therefore an object of the present invention to provide a transducer arrangement for translating mechanical movement into a single short duration output pulse.

It is a further object of the present invention to provide a keyboard detection circuit for detecting key depressions.

It is yet a further object of the present invention to provide a synchronous detector arrangement for detecting key depression in a keyboard, so as to produce a single short duration output pulse.

It is still a further object of the present invention to provide a synchronous detector circuit for detecting key depressions by capacitively coupling system clock pulses to the detector, whereby the detector produces in response thereto, a single output pulse in synchronism with, and of the same time duration as, the initiating clock pulse.

It is yet another object of the present invention to provide a synchronous detector arrangement for detecting capacititive key depressions, in a keyboard arrangement, whereby the first clock pulse to be AC coupled by said capacitive key depressions is detected by the detector and produced at the output thereof, and whereby a variable threshold feedback arrangement is employed to obviate the problems created by "key bounce."

It is still another object of the present invention to provide a synchronous detector arrangement for detecting key depressions in a keyboard in a manner so that the single output pulse indicative of detection is in synchronism with the system clock, and in a manner so that the problems created by "key bounce" and providing a "key roll" capability are obviated, and so that the number of capacitors employed in the detector arrangement, are at a minimum.

The foregoing and other objects, features and advantages of the invention will be apparent from the following more particular description of the preferred embodiments of the invention, as illustrated in the accompanying drawings.

DETAILED DESCRIPTION OF THE DRAWINGS

Figure 1:
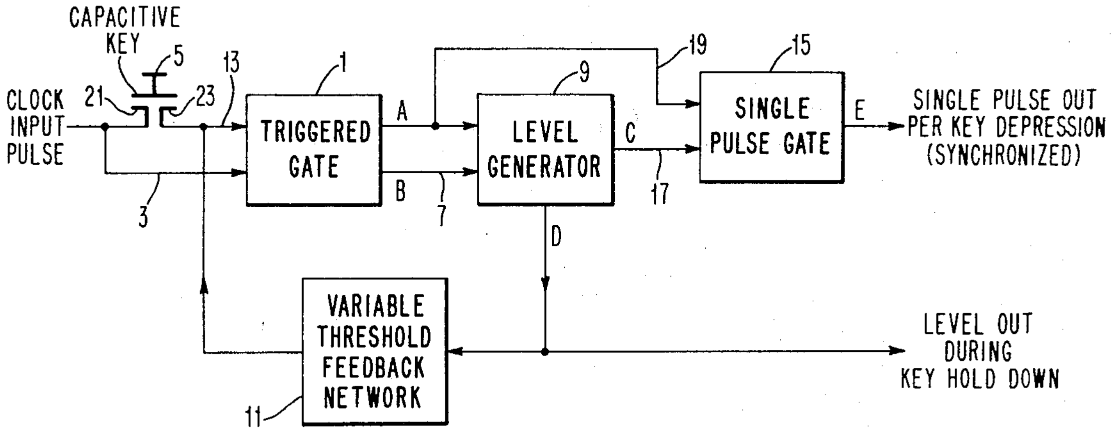
FIG. 1 shows, in block diagram form, one embodiment of the synchronous detector for monopulse key sampling, in accordance with the principles of the present invention.

In FIG. 1 there is shown a block diagram arrangement, representative of the synchronous detector, as utilized in accordance with the present invention. As can be seen, the system clock pulses are continuously inputted to the triggered gate 1 of the detector, via line 3. The system clock pulses are represented in the first of the series of waveforms, depicted in FIG. 2. With capacitive key 5 in the "up" position, the clock pulses on line 3 are transmitted through triggered gate 1, to the output thereof designated B. The pulses appearing on the B output of triggered gate 1, are depicted at B, in FIG. 2. The B output of triggered gate 1 goes to the "-set" input 7 of level generator 9. Since level generator 9, which may, for example, be a bistable switch, is already in its "set" state whereby its C output is in the "up" condition the series of pulses from B have no effect thereon. Level generator 9 also produces a "-down" level at its D output. The C and D outputs of level generator 9, are depicted at C and D, respectively, in FIG. 2.

The D output from level generator 9, as shown in FIG. 1, is fed back to the input of triggered gate 1, via variable threshold feedback network 11. The function of the variable threshold feedback network is to change the trigger level on triggered gate 1, in accordance with the voltage output level, at the D output of level generator 9. In this regard, then, variable threshold feedback network 11 may merely comprise an impedance network, coupled to ground or some other reference point, so as to provide a voltage drop in accordance with the voltage level at the D output of level generator 9. Accordingly, when the D output from level generator 9 is at the "down" level, the voltage level appearing at input 13 to triggered gate 1 is also "-down," and triggered gate 1 is thus ready to be triggered. Triggered gate 1 may, it should be recognized, be any of a variety of triggered gating arrangements which quiescently act to pass input pulses applied thereto to one of its outputs, and in response to the presence of triggering pulses on its trigger input thereof, acts to pass the said input pulses applied thereto to an alternate output thereof.

As shown in FIG. 1, the C output from level generator 9 holds single pulse gate 15 off, via its input 17. Single pulse gate 15 may be any of a variety of arrangements which act to gate a single pulse from its input 19 to its E output in response to a gating signal, i.e. a change in voltage level at input 17 is provided by the C output of level generator 9. In this regard, single pulse gate 15 could be a gating arrangement which is timed to be open for the duration of a single pulse, in response to a change in voltage level at its gate control input 17. Alternatively, single pulse gate 15 could be a gate which is arranged to be opened in response to a voltage level change at its input 17, and which is closed by the trailing edge of the first pulse passing therethrough, from its input 19 thereof. Thus, a gated edge triggered flip-flop might be employed for the gate of 15, whereby the negative edge of a pulse sets the flip-flop at its set input (input 19), and the flip-flop is not reset except by appropriate level change, at its reset input (input 17).

When capacitive key 5, in FIG. 1, is depressed, clock pulses are capacitively coupled to triggered gate 1 of the detector. In this regard, the capacitive coupling is achieved by depressing key 5 to a stop point, whereby the horizontal metal plate thereof is in close proximity with pads 21 and 23. This proximity to pads 21 and 23 is sufficient to AC couple the pads to the metal plate. Accordingly, mechanical contact between the horizontal plate and pads need not be achieved with such arrangement, and thus the problems of contact wear, and the like, are avoided. It is evident that pads 21 and 23 must be sufficiently removed from one another so that any existing coupling therebetween is negligible as compared to signals coupled when key 5 is depressed. Likewise it is evident that when key 5 is in its undepressed state, the horizontal plate thereof must be sufficiently removed from pads 21 and 23 so that no AC coupling is made between the plate and pads.

It should be understood that key 5 may be merely one of the array of keys, in an electronic keyboard arrangement. Each key, in such an array, would have a corresponding detector arrangement, as shown in FIG. 1. The single output pulse from the detector of FIG. 1 may be passed to coding circuitry whereby output pulses may be produced, in a coded arrangement corresponding to the depressed key.

Figure 2:
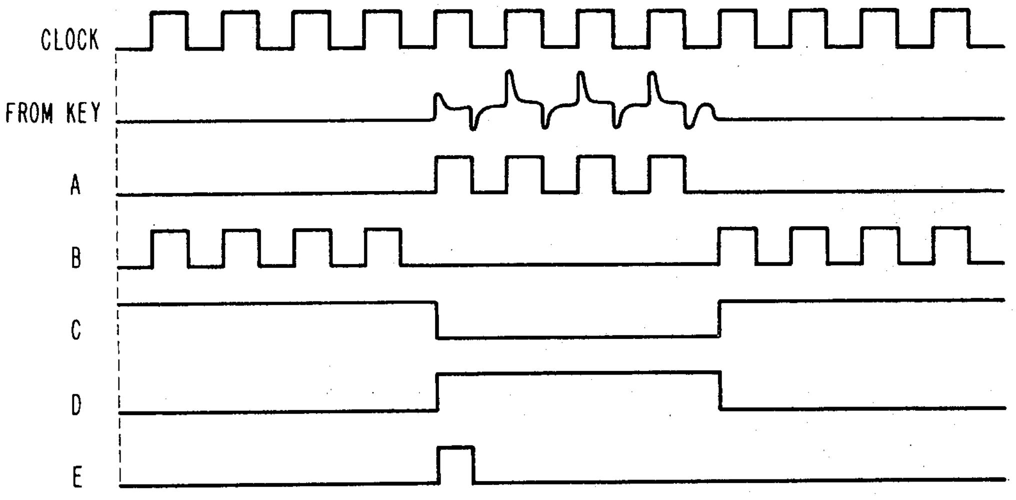
FIG. 2 shows a series of concurrent waveforms, illustrative of the respective voltage levels existing at the points designated by corresponding letters in FIG. 1, during the operation thereof.

With key 5 in FIG. 1 in its depressed state, clock pulses, as shown by the "from key" label in line 2 of FIG. 2, are passed to input 13 of trigger gate 1. It can be seen that these clock pulses are somewhat distorted, and have undergone some degree of differentiation. The leading edge of the first pulse passing through key 5 triggers gate 1, so that the clock pulses at input 3 thereof are transferred to output A thereof. In turn, the leading edge of the first clock pulse on output A of gate 1, resets level generator 9, whereby the levels at outputs C and D of the level generator change. The change in level on output C of level generator 9 acts to reset single pulse gate 15. Since the A output from triggered gate 1 is coupled directly to input 19 of single pulse gate 15, the first clock pulse thereon, which reset level generator 19, arrives at input 19 of gate 15 simultaneous with the resetting thereof, via the level change at input 17. Thus, the first clock pulse to arrive upon depression of key 5, is passed through pulse gate 15 with its trailing edge acting to reset same, whereby a single output pulse in synchronism with the system clock is produced. This pulse is depicted at E in FIG. 2.

In order to prevent "key bounce," and other forms of distortion from causing gate 1 to be triggered "on" and "off" thereby, the "up" level at output D of generator 9 is coupled to the input 13 of gate 1. Accordingly, gate 1 is held in its triggered condition by level generator 9, as long as key 5 is depressed. In this regard, the output pulse produced at output D of generator 9 may also be employed to gate for the duration of this pulse, the pulses appearing at output A of gate 1, as for example, in response to depression of the "repeat" key, as hereinabove described. Alternatively, in this latter regard the pulse at output D may be employed to initiate production of pulse signals, from an oscillator or the like for the duration of this pulse.

Figure 3:
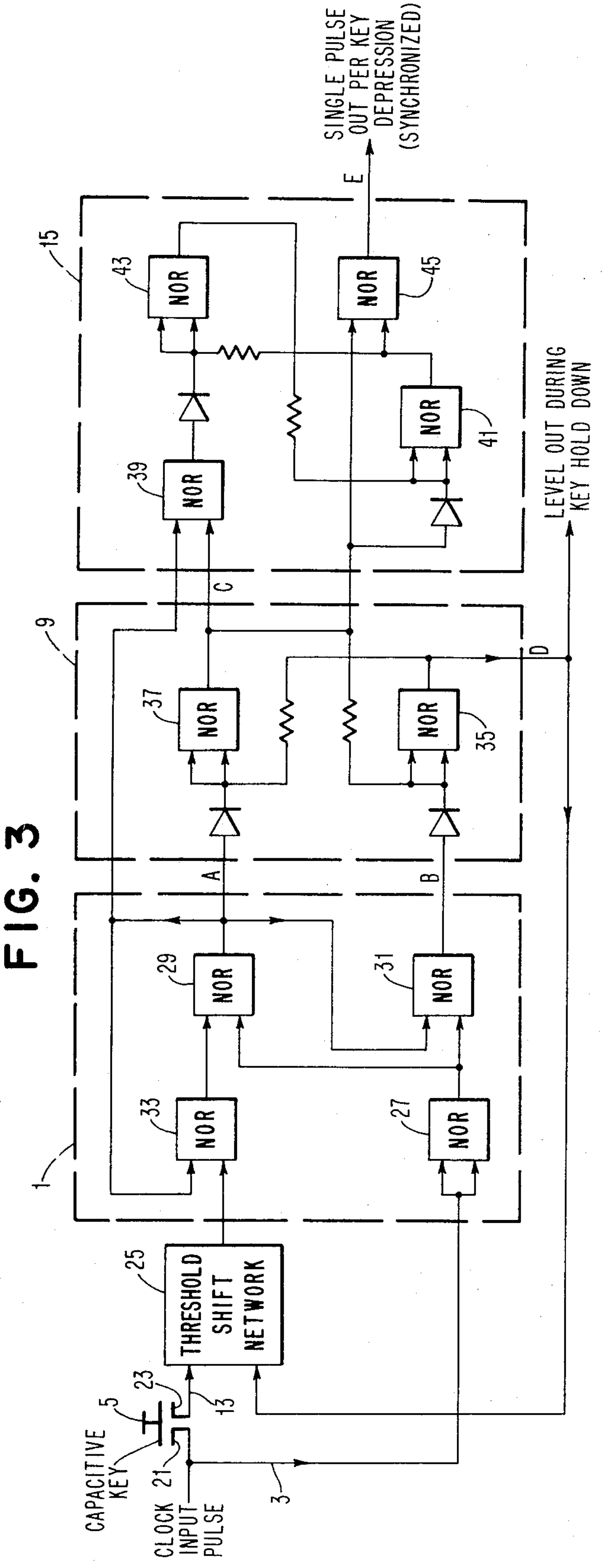
FIG. 3 shows another embodiment of the synchronous detector of the present invention, which embodiment employs NOR logic and utilizes a threshold shift network arrangement, in series with the input thereto.
Figure 4:
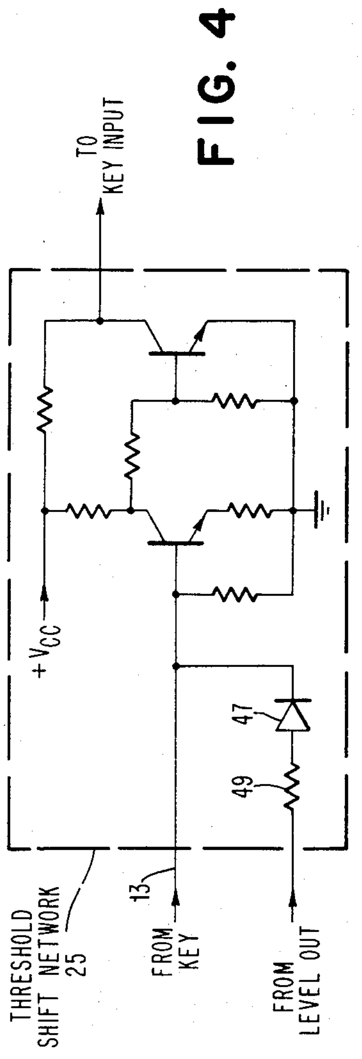
FIG. 4 shows a particular circuit arrangement that may be used for the threshold shift network, employed in FIG. 3.

In the arrangement shown in FIG. 3, like reference characters have been employed, where appropriate, to designate blocks which correspond to the blocks of FIG. 1. However, in the arrangement of FIG. 3, a threshold shift network 25 is employed in series with the input, in contrast with the arrangement in FIG. 1, whereby a threshold feedback network 11 is employed in the feedback path. The threshold shift network of FIG. 3 is employed to provide a greater voltage range and sensitivity in the variable threshold operation, by employing an active element amplifying arrangement, in series with the input. FIG. 4 shows a typical active element circuit arrangement for performing this function.

The circuit of FIG. 3 operates in a manner akin to the operation of the circuit shown in FIG. 1. The continuous stream of clock pulses applied to NOR gate 27, is inverted thereby, and thereafter further coupled to both NOR gates 29 and 31. Since, at this time, key 5 is not depressed, no pulses are applied to NOR gate 33, and accordingly, the output thereof is at an "up" level, causing the output of NOR gate 29 to be in the "down" level. With the "down" level from NOR gate 29 being coupled to one input of NOR gate 31, the clock pulses inverted by NOR gate 27 are reinverted by NOR gate 31, whereby the clock pulses as originally received are applied to the inputs of NOR gate 35, which performs inversion. It can be seen, that the output from NOR gate 31 corresponds to the waveforms shown at B in FIG, 2. In this regard, then, NOR gates 27, 29, 31, and 33 comprise triggered gate 1, in FIG. 1, while NOR gates 35 and 37 comprise, in the manner coupled together in FIG. 3, a bistable switch corresponding to level generator 9, in FIG. 1.

With the "down" level from NOR gate 29 being applied to that half of bistable switch 9 which includes NOR gate 37, and with the clock pulses from the output of NOR gate 31 being applied to that half of bistable switch 9 which includes NOR gate 35, the output from latter NOR gate is at its "down" level. This corresponds to the "down" level shown at D in FIG. 2. On the other hand, under the stated conditions, the output from NOR gate 37 is in its "up" condition, corresponding to the "up" level depicted at C in FIG. 2. With the output of NOR gate 37 in its "up" level, the outputs from NOR gates 39 and 45 are in their "down" level, with the output from latter NOR gate corresponding to the voltage levels shown at E, in FIG. 2. Likewise, under the stated conditions, the output from NOR gate 43 is "up" while the output from NOR gate 41 is "-down."

When key 5 is depressed so as to couple clock pulses to the amplifying threshold shift network 25, the output from latter acts to cause the output from NOR gate 33 to go to its "down" level. With the output from NOR gate 33 in its "down" level, the inverted clock pulses applied to NOR gate 29 from NOR gate 27 are reinverted thereat. The pulses appearing at the output of NOR gate 29, at this time, correspond to the pulses depicted at A in FIG. 2. At this time, the output levels at NOR gates 35 and 37 reverse, in response to the leading edge of the first pulse passed through NOR gate 29. This latter reversal of voltage levels is depicted at C and D, respectively, in FIG. 2. In the same manner as described in regard to the operation of FIG. 1, NOR gate 39 responds to the change in voltage level at C (output of NOR gate 37), and the leading edge of the first clock pulse at A (output of NOR gate 29), to initiate production of a single clock output pulse, as shown at E in FIG. 2.

It should be noted, that the voltage level at the output of NOR gate 35 is directly fed back to threshold shift network amplifying arrangement 25. With regard to FIG. 4, it can be seen that when the output D from NOR gate 35 in FIG. 3 goes to its "up" level, this "up" level is coupled, via diode 47 and resistor 49, to the input of the amplifying arrangement shown therein. It is evident, that in this manner, noise and distortions and the like, in the input pulses coupled to the detector via depression of key 5, do not affect the logic state of NOR gate 33 during these key depressions.

While the invention has been particularly shown and described with reference to preferred embodiments thereof, it will be understood by those skilled in the art that the foregoing and other changes in format and details may be made therein without departing from the spirit and scope of the invention.

What is claimed is:

1. A detector circuit for producing a single output pulse in response to each key depression, comprising:

triggered gate means having input means and a pair of outputs and responsive at its input means to produce signal indications at one of its pair of outputs when said key is in an undepressed condition and to produce signal indications at the other of its pair of outputs when said key is in a depressed condition;

level producing means having two inputs and two outputs with one of its two inputs coupled to the said one of said pair of outputs of said triggered gate means to produce at one of its two outputs in response to said signal indications from said gate means one level change and with the other of its two inputs coupled to the said other of said pair of outputs of said triggered gate means to produce at the other of its two outputs in response to said signal indications from said gate means another level change;

feedback means coupling the said one of said two outputs of said level producing means to the said input means of said triggered gate means to prevent triggering of latter due to signal distortions including those from key bounce; and gate means responsive to both the said another level change at the said other of said two outputs of said level producing means and the said signal indications of the said other output of said triggered gate means to produce said single output pulse for each key depression.

2. The detector as set forth in claim 1 wherein said output pulse is produced in synchronism with clock pulses.

3. The detector as set forth in claim 2 wherein said output pulse is of the same time duration as said clock pulses.

4. The detector as set forth in claim 3 wherein the time duration of said one level change from the said one of said two outputs of said level producing means corresponds to the time duration of said key depression.

5. The detector as set forth in claim 1 wherein the said input means of said triggered gate means comprises two inputs with one of said two inputs continuously coupled to a source of clock signals and with the other of said two inputs coupled to said source of clock signals when said key is depressed.

6. The detector as set forth in claim 5 wherein the said other of said two inputs is capacitively coupled to said source of clock signals when said key is depressed.

7. The detector as set forth in claim 6 wherein said input means includes amplifying means coupled between said two inputs and said triggered gate means and wherein said feedback means is coupled to the said other of said two inputs.

8. The system as set forth in claim 7 wherein the time duration of said one level change from the said one of said two outputs of said level producing means corresponds to the time duration of each said depression.

9. The system as set forth in claim 8 wherein said triggered gate means, sad level producing means and said gate means comprise NOR logic circuits.

10. A synchronous detector circuit for detecting clock pulses capacitively coupled thereto in response to key depressions and producing for each key depression one output pulse in synchronism with and of the same time duration as said clock pulses, comprising;

gate means having two inputs and two outputs with one of its two inputs continuously coupled to clock pulse source means so as to produce at one of its two outputs said clock pulses and with the other of its two inputs capacitively coupled during key depressions to said clock pulse source means so as to produce during said key depressions clock pulses at the other of its two outputs;

voltage level producing means having two inputs respectively coupled to the said two outputs of said gate means and having two outputs each of which has a pair of voltage levels between which said voltage producing means changes upon said key depression;

feedback circuit means coupled between one of the said two outputs of said voltage level producing means and the said other of said two inputs of said gate means so as to couple the voltage level at said one output to which said voltage producing means changes upon key depressions to the said other of said two inputs of said gate means so as to provide thereto a constant voltage during key depressions; and pulse producing means coupled to the other of said two outputs of said voltage level producing means so as to be responsive to the said voltage changes thereat upon key depressions to initiate production of said one output pulse for each depression and coupled to the said other of said two outputs of said gate means so as to be responsive to the trailing edge of the first pulse produced thereat during key depressions to terminate production of said one output pulse.

* * * * *